US011461309B2

(12) United States Patent
Cruanes et al.

(10) Patent No.: US 11,461,309 B2
(45) Date of Patent: *Oct. 4, 2022

(54) INCREMENTAL REFRESH OF A MATERIALIZED VIEW

(71) Applicant: Snowflake Inc., Bozeman, MT (US)

(72) Inventors: Thierry Cruanes, San Mateo, CA (US); Benoit Dageville, San Mateo, CA (US); Prasanna Rajaperumal, San Mateo, CA (US); Jiaqi Yan, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/238,539

(22) Filed: Apr. 23, 2021

(65) Prior Publication Data

US 2021/0240695 A1 Aug. 5, 2021

Related U.S. Application Data

(63) Continuation of application No. 16/662,645, filed on Oct. 24, 2019, now Pat. No. 11,030,186.

(60) Provisional application No. 62/751,123, filed on Oct. 26, 2018.

(51) Int. Cl.
G06F 16/23 (2019.01)
G06F 16/24 (2019.01)
G06F 16/27 (2019.01)
G06F 16/22 (2019.01)

(52) U.S. Cl.
CPC ...... G06F 16/2365 (2019.01); G06F 16/2282 (2019.01); G06F 16/2393 (2019.01); G06F 16/24 (2019.01); G06F 16/278 (2019.01)

(58) Field of Classification Search
None
See application file for complete search history.

(56) References Cited

U.S. PATENT DOCUMENTS 6,708,179 B1 3/2004 Arora
6,882,993 B1 4/2005 Lawande et al.
11,030,186 B2 6/2021 Cruanes et al.
(Continued)

FOREIGN PATENT DOCUMENTS

CN 113228000 A 8/2021
WO WO-2016/175880 A1 11/2016
WO WO-2020/086832 A1 4/2020

OTHER PUBLICATIONS

"U.S. Appl. No. 16/662,645, Examiner Interview Summary dated Mar. 16, 2020", 3 pgs.
(Continued)

Primary Examiner — Giuseppi Giuliani
(74) Attorney, Agent, or Firm — Schwegman Lundberg & Woessner, P.A.

(57) ABSTRACT

Systems, methods, and devices for incrementally refreshing a materialized view are disclosed. A method includes generating a materialized view based on a source table. The method includes merging the source table and the materialized view to generate a merged table to identify whether an update has been executed on the source table that is not reflected in the materialized view. The method includes, in response to detecting an update made to the source table that is not reflected in the materialized view, applying the update to the materialized view.

14 Claims, 10 Drawing Sheets

(56) References Cited

U.S. PATENT DOCUMENTS

| | | |
|---|---|---|
| 2006/0122964 A1* | 6/2006 | Yu .................. G06F 16/2393 |
| 2009/0119247 A1 | 5/2009 | Bellamkonda et al. |
| 2010/0161555 A1 | 6/2010 | Nica et al. |
| 2011/0106790 A1 | 5/2011 | Gupta et al. |
| 2011/0137875 A1 | 6/2011 | Ziauddin et al. |
| 2014/0106790 A1 | 4/2014 | Kakinada et al. |
| 2014/0280029 A1 | 9/2014 | Ding et al. |
| 2015/0088812 A1 | 3/2015 | Ziauddin et al. |
| 2015/0234682 A1 | 8/2015 | Dageville et al. |
| 2020/0034365 A1* | 1/2020 | Martin ............... G06F 16/2358 |
| 2020/0133937 A1 | 4/2020 | Cruanes et al. |

OTHER PUBLICATIONS

"U.S. Appl. No. 16/662,645, Examiner Interview Summary dated Jul. 22, 2020", 3 pgs.

"U.S. Appl. No. 16/662,645, Final Office Action dated May 19, 2020", 30 pgs.

"U.S. Appl. No. 16/662,645, Final Office Action dated Nov. 19, 2020", 27 pgs.

"U.S. Appl. No. 16/662,645, Non-Final Office Action dated Aug. 11, 2020", 26 pgs.

"U.S. Appl. No. 16/662,645, Non-Final Office Action dated Dec. 23, 2019", 21 pgs.

"U.S. Appl. No. 16/662,645, Notice of Allowance dated Mar. 31, 2021", 8 pgs.

"U.S. Appl. No. 16/662,645, Response filed Feb. 19, 2021 to Final Office Action dated Nov. 19, 2020", 14 pgs.

"U.S. Appl. No. 16/662,645, Response Filed Mar. 13, 2020 to Non-Final Office Action dated Dec. 23, 2019", 13 pgs.

"U.S. Appl. No. 16/662,645, Response filed Jul. 22, 2020 to Final Office Action dated May 19, 2020", 15 pgs.

"U.S. Appl. No. 16/662,645, Response filed Nov. 11, 2020 to Non-Final Office Action dated Aug. 11, 2020", 14 pgs.

"International Application Serial No. PCT/US2019/057838, International Search Report dated Jan. 28, 2020", 2 pgs.

"International Application Serial No. PCT/US2019/057838, Written Opinion dated Jan. 28, 2020", 7 pgs.

"International Application Serial No. PCT/US2019/057838, International Preliminary Report on Patentability dated May 6, 2021", 9 pgs.

"Indian Application Serial No. 202147018260, First Examination Report dated Feb. 9, 2022", 8 pgs.

"European Application Serial No. 19875610.8, Extended European Search Report dated Jun. 22, 2022", 9 pgs.

\* cited by examiner

US 11,461,309 B2

INCREMENTAL REFRESH OF A MATERIALIZED VIEW

CROSS-REFERENCE TO RELATED APPLICATIONS

This application is a Continuation of U.S. patent application Ser. No. 16/662,645 filed Oct. 24, 2019, which claims priority to U.S. Provisional Patent Application Ser. No. 62/751,123 filed Oct. 26, 2018, the contents of which are incorporated herein by reference in their entireties.

TECHNICAL FIELD

Embodiments of the present disclosure relate to databases and, more specifically, to materialized views in database systems.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and the transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail company wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

However, further to the above example, the retail company may have a database table storing an enormous sum of information. It can be challenging to execute queries on a very large table because a significant amount of time and computing resources are required to scan the entire table. Therefore, it can be desirable to execute a query without scanning the entire table. In some implementations, the query may be executed by reading a materialized view that includes summary information about the table that pertains to the query.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1:
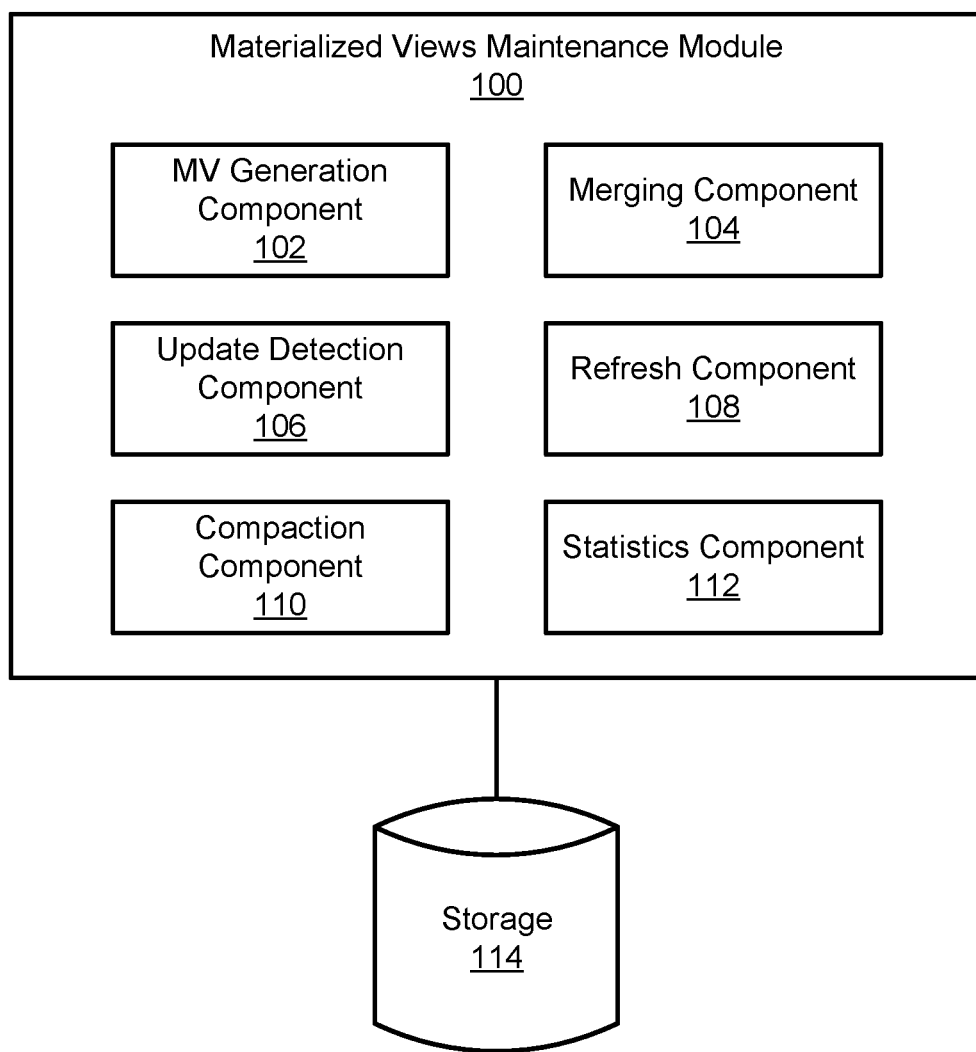
FIG. 1 is a schematic block diagram illustrating components of a materialized view maintenance system, according to embodiments of the disclosure.

Disclosed herein are systems, methods, and devices for incrementally refreshing materialized views in database systems. The systems, methods, and devices disclosed herein improve database performance by ensuring materialized views are up-to-date and are not stale with respect to their source tables. The materialized views can be used for hastening query performance and reducing the amount of memory required for responding to queries. Additionally, the systems, methods, and devices disclosed herein ensure that "internal" database tasks such as refreshing materialized views do not limit the processing capacity for executing "external" database tasks such as client queries.

In an embodiment of the disclosure, a method for maintaining a materialized view is disclosed. The method includes generating a materialized view based on a source table. The method includes merging the source table and the materialized view to detect an update to the source table that is not reflected in the materialized view. The update to the source table comprises one or more of adding, deleting, or updating rows in the source table since a prior refresh and/or a prior compaction of the materialized view. The method includes, in response to detecting the update to the source table, applying the update to the materialized view.

In an embodiment, the method includes generating the materialized view based on the source table, wherein the source table is organized in a plurality of micro-partitions. The method includes merging the source table and the materialized view to generate a merged table. The method includes scanning the merged table to detect a new micro-partition inserted into the source table that is not present in the materialized view and scanning the merged table to detect an absence of a deleted partition removed from the source table that is still present in the materialized view. The method includes detecting an update to the source table, wherein the update includes one or more of the new partition inserted into the source table since a prior refresh of the materialized view or the deleted partition removed from the source table since a prior compaction of the materialized view. The method includes, in response to detecting the new micro-partition inserted into the source table, refreshing the materialized view by inserting the new micro-partition into the materialized view. The method includes, in response to detecting the deleted micro-partition removed from the source table, compacting the materialized view by removing the deleted micro-partition from the materialized view.

Databases are widely used for data storage and data access in computing applications. Databases may include one or more tables that include or reference data that can be read, modified, or deleted using queries. However, for some modern data warehouse systems, executing a query can be exceptionally time and resource intensive because modern data warehouse systems often include tables storing petabytes of data. Querying very large databases and/or tables might require scanning large amounts of data. Reducing the amount of data scanned for database queries is one of the main challenges of data organization and processing. When processing a query against a very large sum of data, it can be important to use materialized views to reduce the amount of time and processing resources required to execute the query. The systems, methods, and devices of the disclose provide means for improving query performance by incrementally refreshing materialized views to ensure the materialized views are up-to-date and can provide accurate information to be used when responding to queries.

A materialized view is a database object that includes final or intermediate results of a database query. The materialized view may include a local cached copy of database data, a subset of rows or columns of a table, the result of a join, the result of an aggregate function, and so forth. Materialized views may be defined by a client or system administrator and may include any suitable information. Materialized views are commonly generated to aid in the execution of specific common queries.

A materialized view as disclosed in the present application is a declarative specification of a persistent query result that is automatically maintained and transparently utilized. In an embodiment, a materialized view includes a local copy of data located remotely or may include a subset of rows and/or columns (may be referred to as a "partition" or "micro-partition") of a source table or join result or may alternatively include a summary using an aggregate function. Materialized views are generated by way of materialization, where the results of a query are cached similar to memorization of the value of a function in functional languages. Materialized views improve performance of expensive queries by materializing and reusing common intermediate query results in a workload. Materialized views are utilized to improve performance of queries at the expense of maintenance cost and increased storage requirements.

To aid in understanding the disclosure, an example implementation of using a materialized view is provided. An example client of a database platform is a marketing organization. In the example, the marketing organization stores large sums of database data pertaining to potential customers that may purchase goods or services that are advertised by the marketing organization. The marketing organization may store, for example, names, contact information, gender, socioeconomic status, and other information about each potential customer. The marketing organization may commonly run advertising campaigns that are specific to different geographic regions. Because the marketing organization is interested in the locations of its potential customers, the marketing organization may commonly run queries to identify all potential customers in a certain city, state, or geographic region. For example, the marketing organization may request to know how many male potential customer and how many female potential customers are located in the state of California in the United States. Because the marketing organization frequently wants to know this information for different marketing campaigns, the marketing organization may define a materialized view for this information. The materialized view might give two summary numbers, one indicating the quantity of male potential customers in the state of California, and another indicating the quantity of female potential customers in the state of California. These numbers are determined based on a "source table" for the materialized view. The source table could be very large and may include information for every potential customer of the marketing organization. When the source table is updated, the materialized view may become "stale" with respect to the source table such that the materialized view no longer provides accurate numbers for the quantities of male and female potential customers in the state of California. It is therefore desirable to ensure the materialized view is refreshed with respect to its source table so the materialized view can be relied upon when executing database queries. It should be appreciated this example implementation is provided only for aiding in the understanding of the disclosure and should not be limiting to the scope of the disclosure. The materialized view may provide any suitable information and may be customized by the client account. The materialized view does not necessarily provide aggregate information as discussed in the example implementation and may provide different information suitable to the needs of the client account.

Materialized views may provide certain performance benefits to database operations. A materialized view may require a small amount of additional storage when compared against a source table from which the materialized view is based. The materialized view may be automatically updated and maintained by the database system and may be transparently utilized without changing an existing workload on the source table.

Before the methods, systems, and devices for maintaining a materialized view are disclosed and described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, a database table is a collection of records (rows). Each record contains a collection of values of table attributes (columns). Database tables are typically physically stored in multiple smaller (varying size or fixed size) storage units, e.g. files or blocks.

As used herein, a micro-partition is an immutable storage device in a database table that cannot be updated in-place and must be regenerated when the data stored therein is modified.

Applicant has developed systems, methods, and devices for low-cost incremental maintenance of a materialized view. Such systems, methods, and devices provide maintenance of a materialized view of a database in a low-cost manner that ensures freshness of the materialized view. In some implementations, a client account may indicate that a materialized view may only be used when the materialized view is "fresh" with respect to its source table and includes correct and up-to-date data. Especially in very large data warehouses, it can be difficult and costly to maintain a fresh materialized view on every data manipulation language (DML) operation. The materialized view can be costly and inefficient to maintain as the materialized view may be very large and include numerous partitions or micro-partitions in certain embodiments. Thus, efficient use of the materialized view can be challenging to achieve because maintenance of the materialized view is costly.

In an embodiment, a materialized view is consistently maintained and updated by incrementally refreshing the materialized view with respect to its source table. Maintenance of the materialized view can be carried out asynchronously such that updates on the source table are decoupled from refreshing or compacting the materialized view. Disclosed herein are systems, methods, and devices for incremental and low-cost maintenance of a materialized view such that it is consistent with its source table and continually refreshed in response to changes to the source table.

Some embodiments of the disclosure may refer to a "micro-partition" as storing a portion of the data in a database table. The micro-partition as discussed herein may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata. Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

Embodiments disclosed herein may be applied to data or tables in a database. By maintaining a fresh materialized view of a source table, multiple database queries can be improved. Embodiments may include the ability to store the results of a query such that a query response may include data directly from the materialized view and not from the source table. The materialized view may promote improved performance with complex joins by enabling quick retrieval of data by querying the materialized view. Additionally, in data warehouses, the materialized view may pre-compute and store aggregated data to eliminate overhead associated with expensive joins or aggregations for a large or frequently utilized class of queries. The materialized view may take a snapshot of a remote source table and store a local copy of the remote data. Materialized views may further enable an account to download a subset of data from central servers to a mobile client with periodic refreshes from the central servers and propagation of updates by clients back to the central servers.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Referring now to the figures, FIG. 1 illustrates a schematic block diagram of a materialized view maintenance module 100. The materialized view maintenance module 100 includes a materialized view ("MV") generation component 102, a merging component 104, an update detection component 106, a refresh component 108, a compaction component 110, and a statistics component 112. The materialized view maintenance module 100 is in communication with storage 114 such as database storage.

The materialized view maintenance module 100 can be configured to implement automatic incremental refreshing of a materialized view associated with a database source table. For example, the MV generation component 102 may generate a materialized view based on a source table. The merging component 104 may update the materialized view and the source table such that the update detection component 106 may detect whether any updates have occurred on the source table that are not reflected in the materialized view. The refresh component 108 may refresh the materialized view by adding a new row that has been added to the source table since a prior refresh of the source table. The compaction component 110 may remove a row from the materialized view that corresponds to a deleted row that was removed from the source table since a prior compaction of the source table. The statistics component 112 may generate statistics about the source table, the materialized view, and the incremental refreshing of the materialized view.

The MV generation component 102 generates the materialized view based on the source table. The MV generation component 102 generates the materialized view to have its own domain and have the characteristics of both a table and a view with additional information linked to the source table and versioning information related to the source table. The materialized view is a declarative specification of a persistent query result that is automatically maintained and transparently utilized. The materialized view is a database object that includes the results of a persistent query result on the source table. The materialized view may be a local copy of data located remotely, it may be a subset of rows and/or columns of the source table or join result, or it may be a summary using an aggregate function. The MV generation component 102 may be configured to generate the materialized view by caching results of a query by the process of materialization such that the cached query result is stored as a concrete "materialized" table that may be updated from the original source table. The materialized view may provide improved performance of database queries on large select, join, or aggregate statements. The materialized view provides additional storage that is small compared to the source table, the materialized view may be automatically maintained, and the materialized view may be transparently used without changing an existing workload on the source table. The materialized view includes additional information linked to its management, including a source table identifier, a set of micro-partitions materialized since a last refresh version of the materialized view, and a set of micro-partitions removed since a last compact version of the materialized view.

In an embodiment, the MV generation component 102 stores within the materialized view the same information as for tables e.g. stage information and for views e.g. view definitions. Additionally, the MV generation component 102 stores a source table identifier. The source table identifier is tagged to the materialized view during compilation to indicate the source table that will be utilized for maintenance and incremental updating of the materialized view. The MV generation component 102 further stores an indication of a type of materialized view, wherein the type of materialized view indicates an enumerated type that is utilized to determine the scope of a materialized view (e.g. projection, summary, synopses, join, etc.). In addition, the MV generation component 102 may include information specific to DML versioning that is added to the table version associated with the materialized view. The materialized view may be tagged with a time of a prior refresh and a time of a prior compaction of the materialized view.

In an embodiment, the MV generation component 102 truncates the content of the materialized view such that all micro-partitions are deleted, and a full refresh is executed. This command may be required to support on overwrite enhancement of the materialized view and it may be implemented as a specialized insert command that is generated from the structured query language (SQL) parser. Additionally, a new sub command may be added to the SQL DML to indicate that truncation is required prior to beginning an insert or refresh on the materialized view. The MV generation component 102 may generate this statement as two steps, including (1) carrying out the truncation and (2) carrying out the insertion from the sub-query obtained from the definition of the materialized view.

The merging component 104 is configured to merge the materialized view and the source table. The merging component 104 merges (1) micro-partitions of the materialized view filtered with the set of dropped micro-partitions with the (2) micro-partitions of the source table that are added and not yet materialized. In an embodiment the merging of the materialized view and the source table is similar to partial view expansion. The merging component 104 obtains a set of micro-partitions that have been added since a prior refresh of the source table and further obtains a set of micro-partitions that have been removed since a prior compaction of the source table. It should be appreciated that the micro-partitions include a plurality of rows and a micro-partition may alternatively be referred to as a row, for example an added micro-partition may be referred to as a new row and a removed micro-partition may be referred to as a deleted row without departing from the scope of the disclosure.

The update detection component 106 is configured to detect an update to the source table that is not reflected in the materialized view. In an embodiment, the update detection component 106 is integrated with the merging component 104 and performs a scan on the materialized view when the materialized view is merged with the source table.

In an embodiment the update detection component 106 detects an update to the source table by change tracking based on a transaction log. The transaction log includes indication of micro-partitions/rows that have been added to or removed from the source table. The transaction log distinguishes a refresh of the source table wherein a new micro-partition/row is added from a compaction of the source table wherein a micro-partition/row is removed from the source table. In an embodiment, the materialized view maintains two versions, including a last refresh version and a last compact version. The update detection component 106 maintains a refresh construct that indicates the set of micro-partitions to insert into the materialized view by pulling the log of added micro-partitions that have been added to the source table since the last refresh of the materialized view. The update detection component 106 maintains a compact construct that indicates the set of micro-partitions to remove from the materialized view by pulling the log of micro-partitions that have been removed from the source table since the last compaction of the materialized view.

The refresh component 108 is configured to perform a refresh on the materialized view by adding one or more micro-partitions or new rows to the materialized view. The refresh component 108 receives an indication from the update detection component 108 that a micro-partition or row has been inserted into the source table since the last refresh of the materialized view. The refresh component 108 then inserts that micro-partition or row into the materialized view. The refresh component 108 may receive a single source table identifier for each materialized view that it generates. The refresh component 108 inserts from source table a given set of micro-partitions and updates the last refreshed version of materialized view. In an embodiment, the refresh component 108 is manually triggered, enabled, or disabled by a user utilizing a command. In an embodiment, the refresh component 108 automatically updates the materialized view when the refresh component 108 is enabled.

In an embodiment, the refresh component 108 carries out an insert command. The refresh component 108 receives a log of new micro-partitions that have been added to the source table since a prior refresh of the materialized view. The refresh component 108 inserts the new micro-partitions into the materialized view and may be configured to group the new micro-partitions in a column of the materialized view and order the new micro-partitions in the materialized view. In an embodiment, the metadata for the new micro-partition is consistent between the source table and the materialized view.

The compaction component 110 is configured to perform a compaction on the materialized view by removing one or more micro-partitions or deleted rows from the materialized view. The compaction component 110 receives an indication from the update detection component 106 that a micro-partition or row has been removed from the source table since the last compaction of the materialized view. The compaction component 110 then removes the micro-partition of row from the materialized view. The compaction component 110 may receive a single source table identifier for each materialized view that it generates. The compaction component 110 removes source table micro-partitions from corresponding materialized view micro-partitions to update the last compacted version of the materialized view. In an embodiment, the refresh component 108 is prioritized over the compaction component 110 because compaction of the materialized view can be particularly costly and time intensive. In an embodiment, the compaction component 110 will compact the materialized view only after receiving a threshold number of rows, columns and/or micro-partitions that have been removed from the source table since a prior compaction of the materialized view. In such an embodiment, the compaction component 110 will not operate after every removal operation on the source table and will instead operate only after a threshold number of removals have occurred on the source table.

In an embodiment, the compaction component 110 carries out a delete command. The compaction component 110 receives a log of deleted micro-partitions that have been deleted from the source able since a prior compaction of the materialized view. The compaction component 110 deletes the deleted micro-partitions from the materialized view. In an embodiment, access to active files of the materialized view may be more efficient than access to the list of deleted micro-partitions.

In an embodiment, updates performed by either of the refresh component 108 and the compaction component 110 are automatically updated according to constraints received from a client account. The client account may indicate constraints on freshness and cost. The constraints may indicate a priority for the client account to always maintain a fresh materialized view or to prioritize cost and permit the materialized view to go without an update for a period. The system may automatically schedule refresh or compaction of the materialized view based on the constraints received from the client account. In an embodiment, the system provides visibility on the cost of updating the materialized view to the client account.

The statistics component 112 maintains statistics on freshness and usefulness of the materialized view. The statistics component 112 generates maintenance statistics on the freshness of the materialized view. Such maintenance statistics include a number of micro-partitions of the source table that have been materialized, a total number of micro-partitions of the source table, and/or a total number of micro-partitions of the materialized view. The statistics component 112 generates usage statistics on the usefulness of the materialized view. Such usefulness statistics may include a number of times a query has accessed the materialized view and a number of times a query has accessed the source table.

The storage 114 may include database storage and may be configured to store each of a plurality of database tables including a plurality of database files. The storage 114 may include cache memory storage and/or longer term or slower retrieval storage.

In an embodiment, the work performed by the materialized view maintenance module 100 is performed in the background and may occur in a continuous fashion. In an embodiment, as soon as a materialized view is generated based on a source table, the materialized view maintenance module 100 is configured to maintain freshness of the materialized view. In an embodiment, a maximum budget for materialized view maintenance may be altered by a client account. The client account may provide a significant budget for maintenance operations of certain materialized views but provide a smaller budget for other materialized views. The client account may have access to a plurality of priority settings for maintenance operations of various materialized views. The client account may further receive information indicating how frequently and how efficiently a materialized view is refreshed or compacted.

Figure 2:
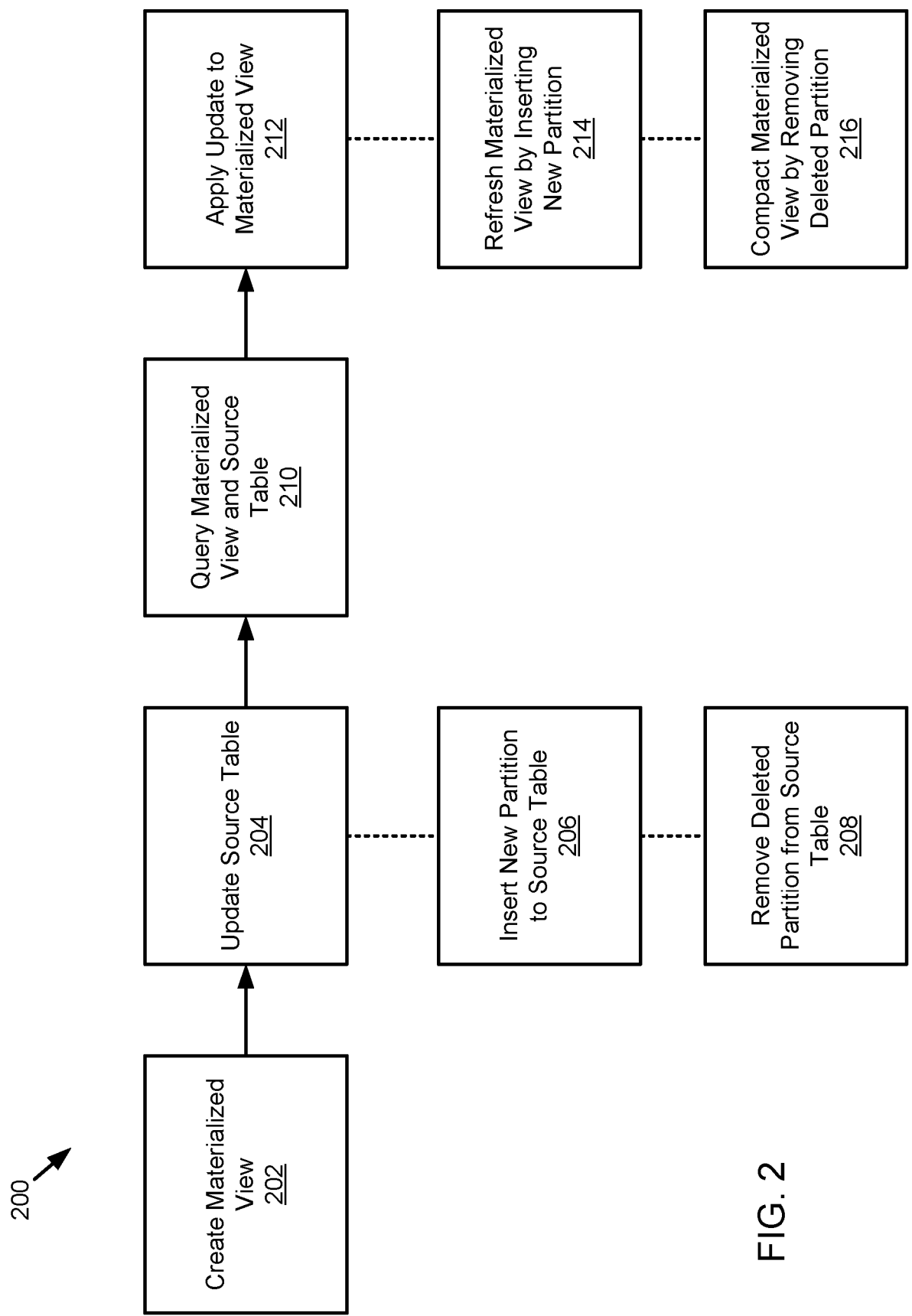
FIG. 2 is a schematic block diagram illustrating a process flow for updating a materialized view, according to embodiments of the disclosure.

FIG. 2 illustrates a schematic block diagram of a process flow 200 for incremental updating of a materialized view. The process flow 200 may be carried out by any suitable computing device, including for example a compute service manager (see compute service manager 702 in FIGS. 7-8) and/or a materialized view maintenance module (see 100 in FIG. 8). The process flow 200 includes creating a materialized view at 202, wherein the materialized view is based on a source table. The process flow 200 includes updating the source table at 204, which may include inserting a new micro-partition into the source table at 206 and/or removing a deleted micro-partition from the source table at 208. The process flow 200 includes querying the materialized view and the source table at 210. Querying at 210 includes detecting whether any updates have occurred on the source table that are not reflected in the materialized view. For example, a new micro-partition may be added to the source table that has not been added to the materialized view. A deleted micro-partition may be removed from the source table that still remains in the materialized view. The process flow 200 includes applying the update to the materialized view at 212. Applying the update 212 may include refreshing the materialized view by inserting the new micro-partition into the materialized view at 214 and/or compacting the materialized view by removing the deleted micro-partition at 216.

Figure 3:
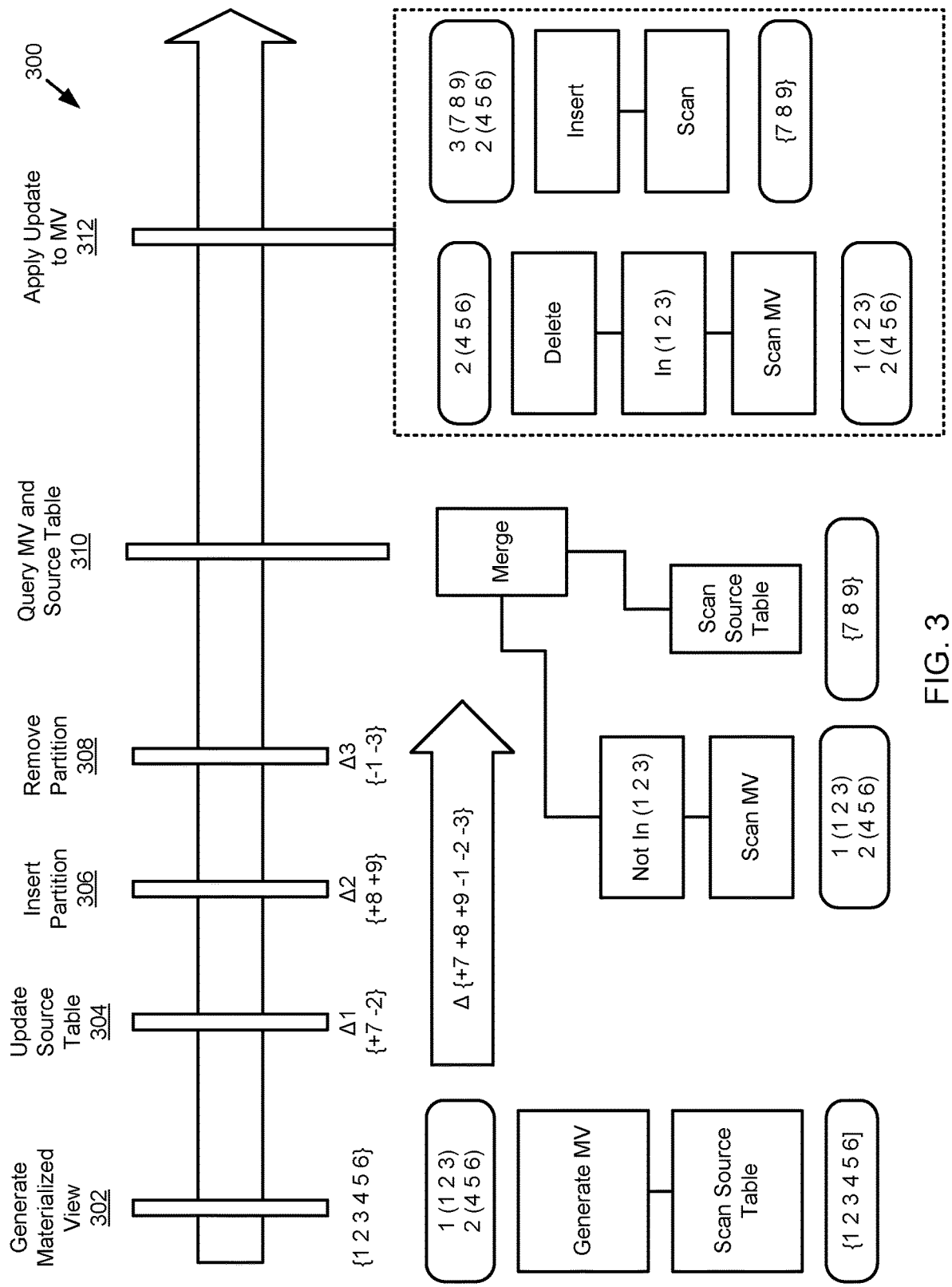
FIG. 3 is a schematic block diagram illustrating a process flow for updating a materialized view, according to embodiments of the disclosure.

FIG. 3 illustrates a schematic block diagram of an example process flow 300 for incremental updating of a materialized view. The process flow 300 may be carried out by any suitable computing device, including for example a compute service manager (see compute service manager 702 in FIGS. 7-8) and/or a materialized view maintenance module (see 100 in FIG. 8). The process flow 300 includes generating a materialized view at 302 that is based on a source table. The process flow 300 includes updating the source table at 304 which may include inserting a micro-partition at 306 and/or removing a micro-partition at 308. The process flow includes querying the materialized view and the source table at 310 to detect any updates to the source table that are not reflected in the materialized view. The process flow 300 includes applying the update to the materialized view at 312.

In the example illustrated in FIG. 3, the materialized view is generated at 302 by scanning a source table. The source table includes the dataset {1 2 3 4 5 6} as illustrated. The corresponding materialized view includes the data sets [1(1 2 3)] and [2(4 5 6)] that may indicate micro-partitions in the database, where the micro-partitions are immutable storage objects in the database.

In the example illustrated in FIG. 3, the source table is updated at 304 (see Δ1) by adding (+7) and removing (−2). Two micro-partitions are inserted into the source table at 306 (see Δ2) by adding (+8) and adding (+9). Two micro-partitions are removed from the source table at 308 (see Δ3) by removing (−1) and (−3). As illustrated in Δ (delta), the overall update to the source table includes {+7 +8 +9 31 1 −2 −3}, which includes each of the various updates (see 41, 42, and 43) that are made on the source table.

In the example illustrated in FIG. 3, the materialized view and the source table are queried at 310. The query 310 includes merging the materialized view and the source table. The source table is scanned and micro-partitions {7 8 9} are detected in the source table and those micro-partitions are not detected in the materialized view. The materialized view is scanned and the micro-partition (1 2 3) is detected in the materialized view and it is not detected in the source table.

In the example illustrated in FIG. 3, the update is applied to the materialized view at 312. The materialized view is scanned, and the system detects the micro-partitions [1(1 2 3)] and [2(4 5 6)], and the system detects that micro-partition [1(1 2 3)] is present in the materialized view and should be removed. The system deletes the micro-partition [1(1 2 3)] such that the micro-partition [2(4 5 6)] remains. The system scans the source table and discovers the micro-partition {7 8 9} and inserts that micro-partition into the materialized view such that the materialized view includes the micro-partitions [2(4 5 6)] and [3(7 8 9)].

Figure 4:
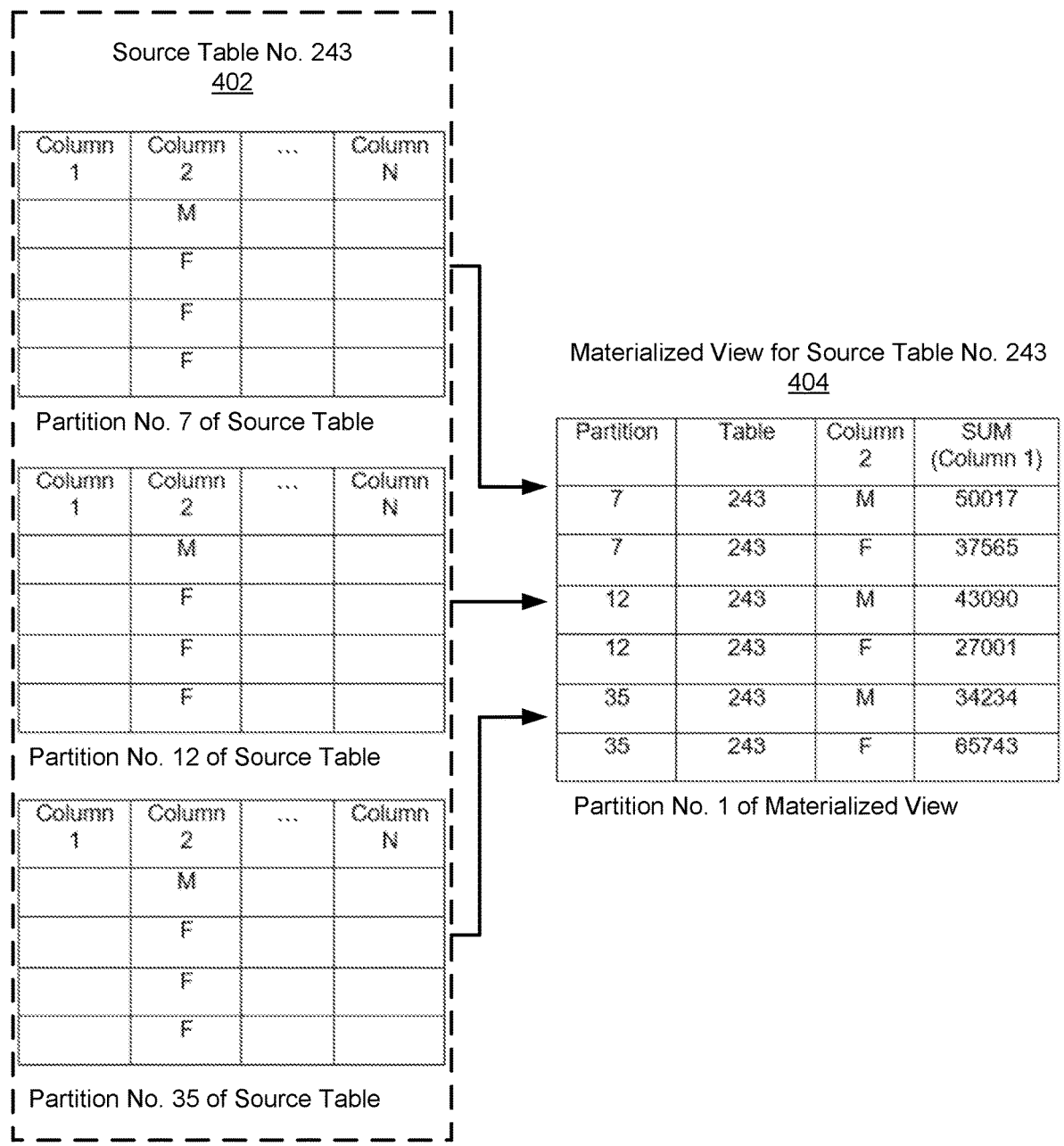
FIG. 4 is a schematic block diagram illustrating an example materialized view and associated micro-partitions of a source table, according to embodiments of the disclosure.

FIG. 4 illustrates example micro-partitions of a source table 402 and an example materialized view 404 generated based on the source table. The source table 402 undergoes a linear transformation to generate a plurality of micro-partitions (see Partition No. 7, Partition No. 12, and Partition No. 35). The plurality of micro partitions may generate a single micro-partition of the materialized view 404 in one embodiment as illustrated in FIG. 4. The micro-partitions are immutable storage objects in the database system. In an embodiment, the micro-partitions are represented as an explicit list of micro-partitions, and in certain embodiments this can be particularly costly. In an alternative embodiment, the micro-partitions are represented as a range of micro-partitions. In an embodiment, the micro-partitions are represented as a DML version indicating a last refresh and last compaction of the source table 402.

The example source table 402 is labeled "Source Table No. 243" to illustrate that any number of source tables may be utilized to generate the materialized view 404, the materialized view 404 may index each of the numerous source tables (see "Table" column in materialized view 404), and/or any number of numerous materialized views may be generated for a number of possible source tables. The source table 402 includes three micro-partitions as illustrated in the example embodiment in FIG. 4. The three micro-partitions of the source table 402 include Partition No. 7, Partition No. 12, and Partition No. 35. FIG. 4 illustrates that the micro-partitions are indexed in the materialized view 404 under the "Partition" column. FIG. 4 further illustrates that the materialized view 404 includes a single micro-partition based on the three micro-partitions of the source table 402. Additional micro-partitions may be added to the materialized view 404 and/or removed from the materialized view 404 as the materialized view 404 is incrementally updated.

As illustrated in FIG. 4, the metadata between the source table 402 and the materialized view 404 is consistent. The metadata of the materialized view 404 is updated to reflect any updates to the metadata of the source table 402.

Figure 5:
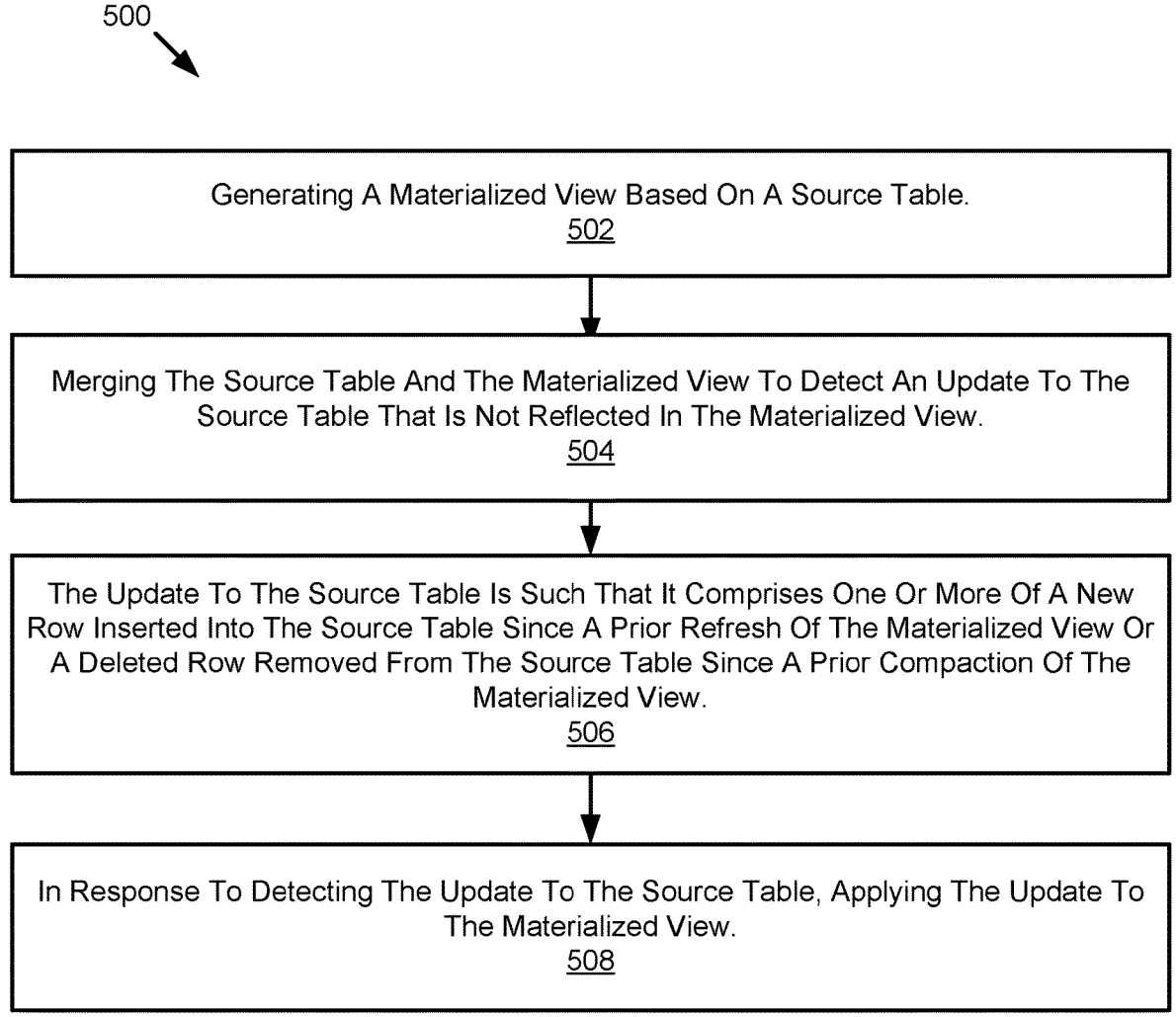
FIG. 5 is a schematic flow chart diagram of a method for updating a materialized view, according to embodiments of the disclosure.

FIG. 5 illustrates a schematic flow chart diagram of a method 500 for incremental updating of a materialized view. The method 500 may be performed by any suitable computing device, including for example a compute service manager 702a materialized views maintenance module 100. The method 500 begins and the computing device generates at 502 a materialized view based on a source table. The computing device merges at 504 the source table and the materialized view to detect an update to the source table that is not reflected in the materialized view. The method 500 is such that the update to the source table includes one or more of a new row inserted into the source table since a prior refresh of the materialized view or a deleted row removed from the source table since a prior compaction of the materialized view (see 506). The method 500 continues and the computing device, in response to detecting the update to the source table, applies the update to the materialized view at 508.

Figure 6:
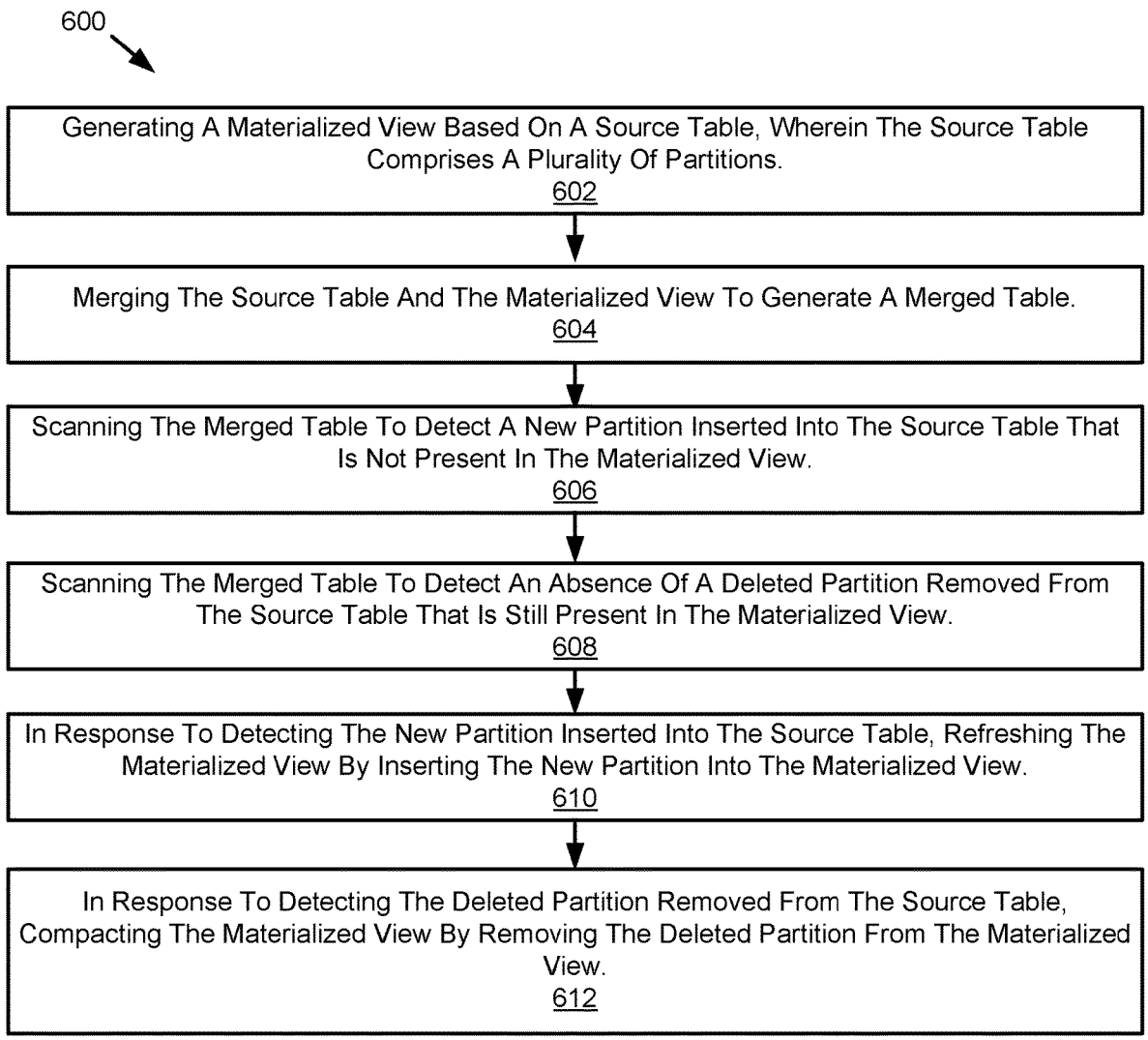
FIG. 6 is a schematic flow chart diagram of a method for updating a materialized view, according to embodiments of the disclosure.

FIG. 6 illustrates a schematic flow chart diagram of a method 600 for micro-partition-based updating of a materialized view. The method 600 may be performed by any suitable computing device, including for example a compute service manager 702 or a materialized view maintenance module 100. The method 600 begins and the computing device generates at 602 a materialized view based on a source table, wherein the source table includes a plurality of micro-partitions. The method 600 continues and the computing device merges at 604 the source table and the materialized view to generate a merged table. The computing device scans the merged table at 606 to detect a new micro-partition inserted into the source table that is not present in the materialized view. The computing device scans the merged table at 608 to detect an absence of a deleted micro-partition removed from the source table that is still present in the materialized view. The method 600 continues and the computing device, in response to detecting the new micro-partition inserted into the source table, refreshes at 610 the materialized view by inserting the new micro-partition into the materialized view. The computing device, in response to detecting the deleted micro-partition removed from the source table, compacts at 612 the materialized view by removing the deleted micro-partition from the materialized view.

Figure 7:
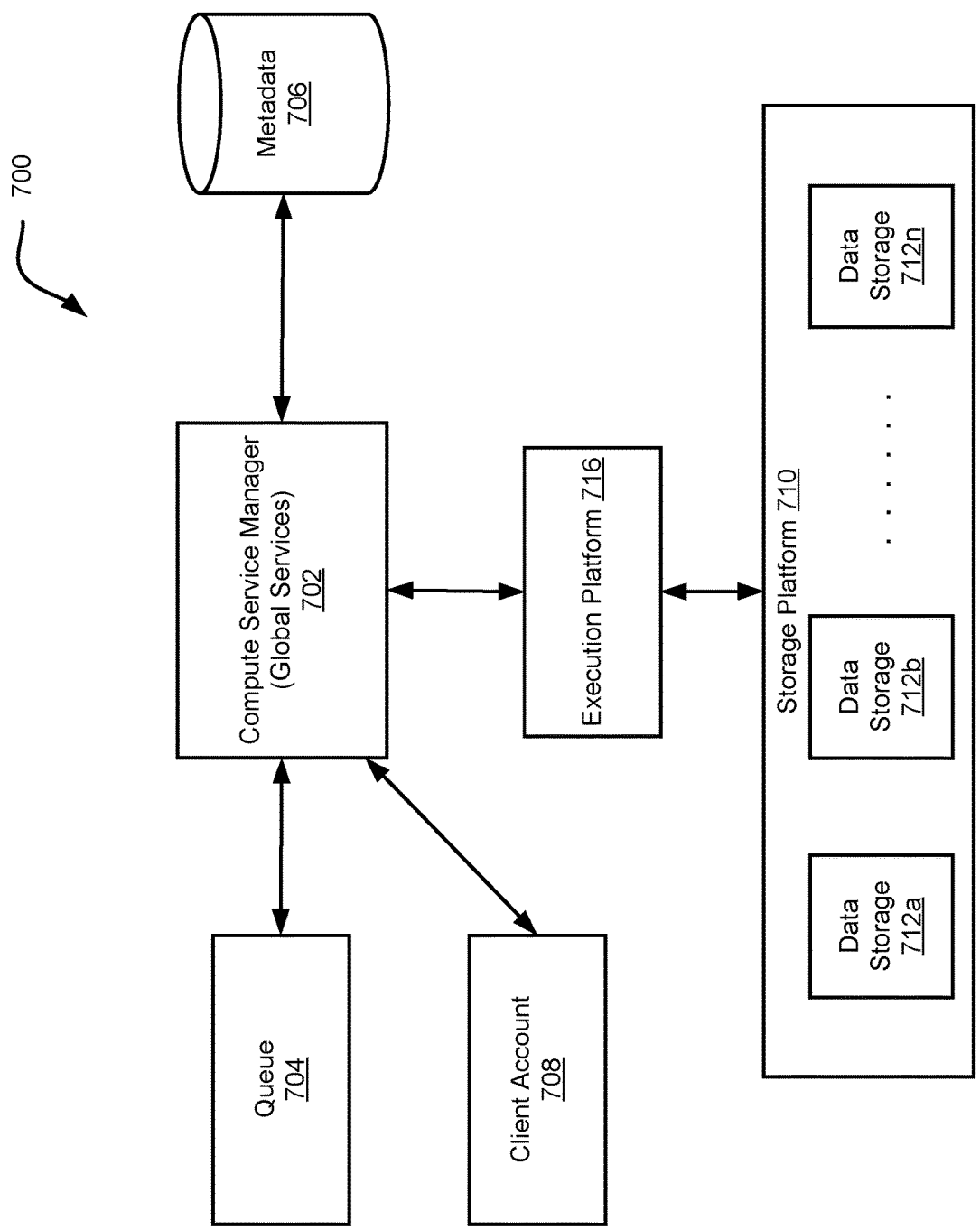
FIG. 7 is a block diagram illustrating a processing platform for a database system, according to embodiments of the disclosure.

FIG. 7 is a block diagram depicting an example embodiment of a data processing platform 700. As shown in FIG. 7, a compute service manager 702 is in communication with a queue 704, a client account 708, metadata 706, and an execution platform 716. In an embodiment, the compute service manager 702 does not receive any direct communications from a client account 708 and only receives communications concerning jobs from the queue 704. In such an embodiment, the compute service manager 702 may be configured to perform only "internal" database tasks that do not include queries received from client accounts. Such internal tasks may include, for example, reclustering tables as disclosed herein, updating materialized views, refreshing metadata, and so forth. In particular implementations, the compute service manager 702 can support any number of client accounts such as end users providing data storage and retrieval requests, system administrators managing the systems and methods described herein, and other components/devices that interact with compute service manager 702. As used herein, compute service manager 702 may also be referred to as a "global services system" that performs various functions as discussed herein.

The compute service manager 702 is in communication with a queue 704. The queue 704 may provide a job to the compute service manager 702 in response to a trigger event. One or more jobs may be stored in the queue 704 in an order of receipt and/or an order of priority, and each of those one or more jobs may be communicated to the compute service manager 702 to be scheduled and executed. The queue 704 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth. In an embodiment, the queue 704 includes entries for refreshing a materialized view. The queue 704 may include entries for refreshing a materialized view that is generated over a local source table (i.e. local to the same account operating the compute service manager 702) and/or refreshing a materialized view that is generated over a shared source table that is managed by a different account.

The compute service manager 702 is also coupled to metadata 706, which is associated with the entirety of data stored throughout data processing platform 700. In some embodiments, metadata 706 includes a summary of data stored in remote data storage systems as well as data available from a local cache. Additionally, metadata 706 may include information regarding how data is organized in the remote data storage systems and the local caches. Metadata 706 allows systems and services to determine whether a piece of data needs to be accessed without loading or accessing the actual data from a storage device.

In an embodiment, the compute service manager 702 and/or the queue 704 may determine that a job should be performed based on the metadata 706. In such an embodiment, the compute service manager 702 and/or the queue 704 may scan the metadata 706 and determine that a job should be performed to improve data organization or database performance. For example, the compute service manager 702 and/or the queue 704 may determine that a new version of a source table for a materialized view has been generated and the materialized view has not been refreshed to reflect the new version of the source table. The metadata 706 may include a transactional change tracking stream indicating when the new version of the source table was generated and when the materialized view was last refreshed. Based on that metadata 706 transaction stream, the compute service manager 702 and/or the queue 704 may determine that a job should be performed. In an embodiment, the compute service manager 702 determines that a job should be performed based on a trigger event and stores the job in the queue 704 until the compute service manager 702 is ready to schedule and manage the execution of the job. In an embodiment of the disclosure, the compute service manager 702 determines whether a table needs to be reclustered based on DML command being performed, wherein the DML command constitutes the trigger event.

The compute service manager 702 may receive rules or parameters from the client account 708 and such rules or parameters may guide the compute service manager 702 in scheduling and managing internal jobs. The client account 708 may indicate that internal jobs should only be executed at certain times or should only utilize a set maximum amount of processing resources. The client account 708 may further indicate one or more trigger events that should prompt the compute service manager 702 to determine that a job should be performed. The client account 708 may provide parameters concerning how many times a task may be re-executed and/or when the task should be re-executed.

The compute service manager 702 is further coupled to an execution platform 716, which provides multiple computing resources that execute various data storage and data retrieval tasks, as discussed in greater detail below. Execution platform 716 is coupled to multiple data storage devices 712a, 712b, and 712n that are part of a storage platform 710. Although three data storage devices 712a, 712b, and 712n are shown in FIG. 7, execution platform 716 is capable of communicating with any number of data storage devices. In some embodiments, data storage devices 712a, 712b, and 712n are cloud-based storage devices located in one or more geographic locations. For example, data storage devices 712a, 712b, and 712n may be part of a public cloud infrastructure or a private cloud infrastructure. Data storage devices 712a, 712b, and 712n may be hard disk drives (HDDs), solid state drives (SSDs), storage clusters, Amazon S3™ storage systems or any other data storage technology. Additionally, storage platform 710 may include distributed file systems (such as Hadoop Distributed File Systems (HDFS)), object storage systems, and the like.

In particular embodiments, the communication links between compute service manager 702, the queue 704, metadata 706, the client account 708, and the execution platform 716 are implemented via one or more data communication networks. Similarly, the communication links between execution platform 716 and data storage devices 712a-712n in the storage platform 710 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 7, data storage devices 712a, 712b, and 712n are decoupled from the computing resources associated with the execution platform 716. This architecture supports dynamic changes to data processing platform 700 based on the changing data storage/retrieval needs as well as the changing needs of the users and systems accessing data processing platform 700. The support of dynamic changes allows data processing platform 700 to scale quickly in response to changing demands on the systems and components within data processing platform 700. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Compute service manager 702, queue 704, metadata 706, client account 708, execution platform 716, and storage platform 710 are shown in FIG. 7 as individual components. However, each of compute service manager 702, queue 704, metadata 706, client account 708, execution platform 716, and storage platform 710 may be implemented as a distributed system (e.g., distributed across multiple systems/platforms at multiple geographic locations). Additionally, each of compute service manager 702, metadata 706, execution platform 716, and storage platform 710 can be scaled up or down (independently of one another) depending on changes to the requests received from the queue 704 and/or client accounts 208 and the changing needs of data processing platform 700. Thus, in the described embodiments, data processing platform 700 is dynamic and supports regular changes to meet the current data processing needs.

During a typical operation, data processing platform 700 processes multiple jobs received from the queue 704 or determined by the compute service manager 702. These jobs are scheduled and managed by the compute service manager 702 to determine when and how to execute the job. For example, the compute service manager 702 may divide the job into multiple discrete tasks and may determine what data is needed to execute each of the multiple discrete tasks. The compute service manager 702 may assign each of the multiple discrete tasks to one or more nodes of the execution platform 716 to process the task. The compute service manager 702 may determine what data is needed to process a task and further determine which nodes within the execution platform 716 are best suited to process the task. Some nodes may have already cached the data needed to process the task and, therefore, be a good candidate for processing the task. Metadata 706 assists the compute service manager 702 in determining which nodes in the execution platform 716 have already cached at least a portion of the data needed to process the task. One or more nodes in the execution platform 716 process the task using data cached by the nodes and, if necessary, data retrieved from the storage platform 710. It is desirable to retrieve as much data as possible from caches within the execution platform 716 because the retrieval speed is typically much faster than retrieving data from the storage platform 710.

As shown in FIG. 7, the data processing platform 700 separates the execution platform 716 from the storage platform 710. In this arrangement, the processing resources and cache resources in the execution platform 716 operate independently of the data storage resources 712a-712n in the storage platform 710. Thus, the computing resources and cache resources are not restricted to specific data storage resources 712a-712n. Instead, all computing resources and all cache resources may retrieve data from, and store data to, any of the data storage resources in the storage platform 710. Additionally, the data processing platform 700 supports the addition of new computing resources and cache resources to the execution platform 716 without requiring any changes to the storage platform 710. Similarly, the data processing platform 700 supports the addition of data storage resources to the storage platform 710 without requiring any changes to nodes in the execution platform 716.

Figure 8:
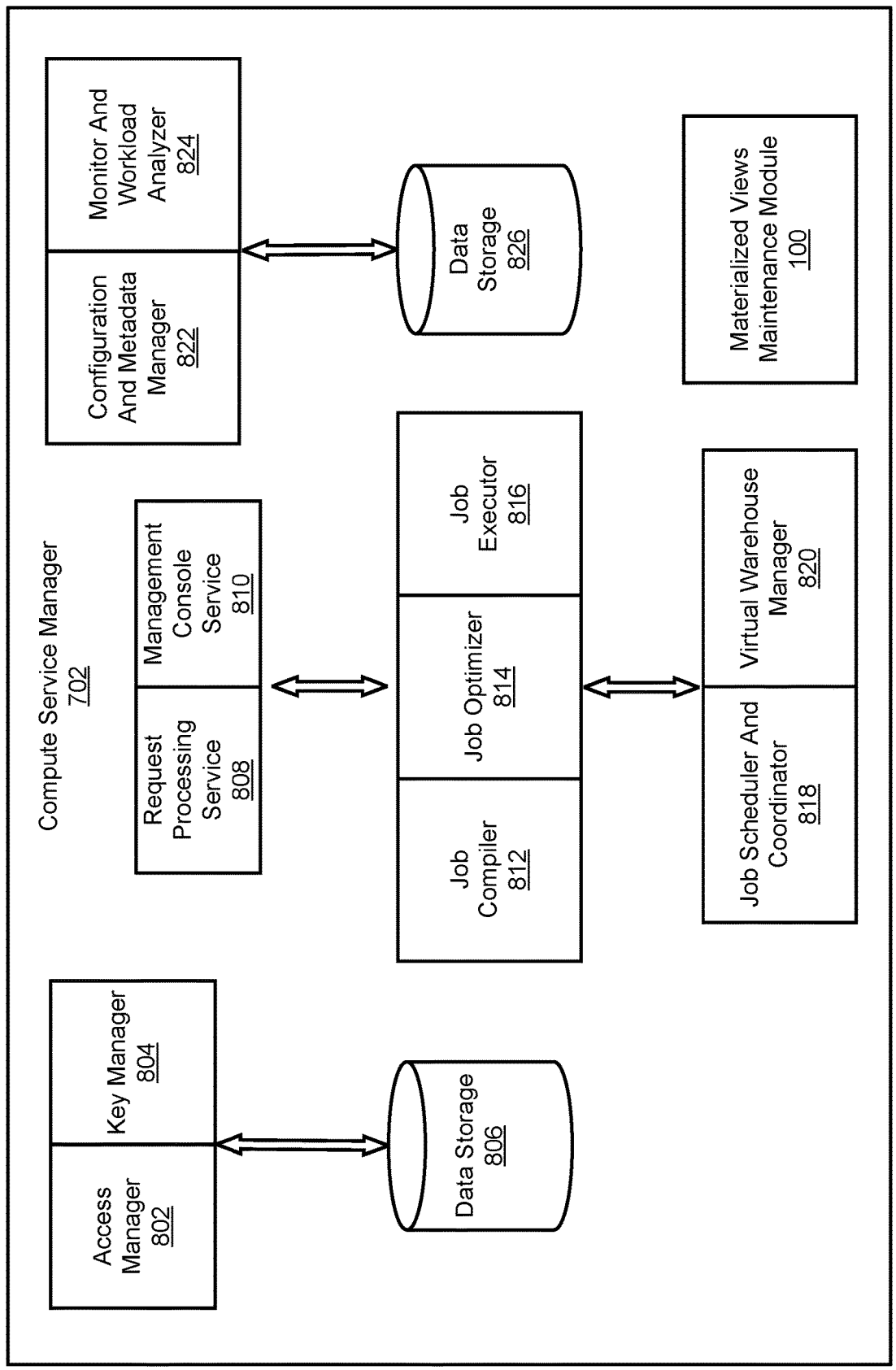
FIG. 8 is a block diagram illustrating components of a compute service manager, according to embodiments of the disclosure.

FIG. 8 is a block diagram depicting an embodiment of the compute service manager 702. As shown in FIG. 8, the compute service manager 702 includes an access manager 802 and a key manager 804 coupled to a data storage device 806. Access manager 802 handles authentication and authorization tasks for the systems described herein. Key manager 804 manages storage and authentication of keys used during authentication and authorization tasks. For example, access manager 802 and key manager 804 manage the keys used to access data stored in remote storage devices (e.g., data storage devices in storage platform 710). As used herein, the remote storage devices may also be referred to as "persistent storage devices" or "shared storage devices." A request processing service 808 manages received data storage requests and data retrieval requests (e.g., jobs to be performed on database data). For example, the request processing service 808 may determine the data to be used to process the received data storage request or data retrieval request. The data may be stored in a cache within the execution platform 716 (as discussed in greater detail below) or in a data storage device in storage platform 710. A management console service 810 supports access to various systems and processes by administrators and other system managers. Additionally, the management console service 810 may receive a request to execute a job and monitor the workload on the system.

The compute service manager 702 also includes a job compiler 812, a job optimizer 814 and a job executor 810. The job compiler 812 parses a job into multiple discrete tasks and generates the execution code for each of the multiple discrete tasks. The job optimizer 814 determines the best method to execute the multiple discrete tasks based on the data that needs to be processed. The job optimizer 814 also handles various data pruning operations and other data optimization techniques to improve the speed and efficiency of executing the job. The job executor 816 executes the execution code for jobs received from the queue 704 or determined by the compute service manager 702.

A job scheduler and coordinator 818 sends received jobs to the appropriate services or systems for compilation, optimization, and dispatch to the execution platform 716. For example, jobs may be prioritized and processed in that prioritized order. In an embodiment, the job scheduler and coordinator 818 determines a priority for internal jobs that are scheduled by the compute service manager 702 with other "outside" jobs such as user queries that may be scheduled by other systems in the database but may utilize the same processing resources in the execution platform 716. In some embodiments, the job scheduler and coordinator 818 identifies or assigns particular nodes in the execution platform 716 to process particular tasks. A virtual warehouse manager 820 manages the operation of multiple virtual warehouses implemented in the execution platform 716. As discussed below, each virtual warehouse includes multiple execution nodes that each include a cache and a processor.

Additionally, the compute service manager 702 includes a configuration and metadata manager 822, which manages the information related to the data stored in the remote data storage devices and in the local caches (i.e., the caches in execution platform 716). As discussed in greater detail below, the configuration and metadata manager 822 uses the metadata to determine which data micro-partitions need to be accessed to retrieve data for processing a particular task or job. A monitor and workload analyzer 824 oversee processes performed by the compute service manager 702 and manages the distribution of tasks (e.g., workload) across the virtual warehouses and execution nodes in the execution platform 716. The monitor and workload analyzer 824 also redistribute tasks, as needed, based on changing workloads throughout the data processing platform 700 and may further redistribute tasks based on a user (i.e. "external") query workload that may also be processed by the execution platform 716. The configuration and metadata manager 822 and the monitor and workload analyzer 824 are coupled to a data storage device 826. Data storage devices 806 and 826 in FIG. 8 represent any data storage device within data processing platform 700. For example, data storage devices 806 and 826 may represent caches in execution platform 716, storage devices in storage platform 710, or any other storage device.

The compute service manager 702 also includes the materialized views maintenance module 100 as disclosed herein. The materialized views maintenance module 100 is configured to ensure materialized views are fresh with respect to their source tables.

Figure 9:
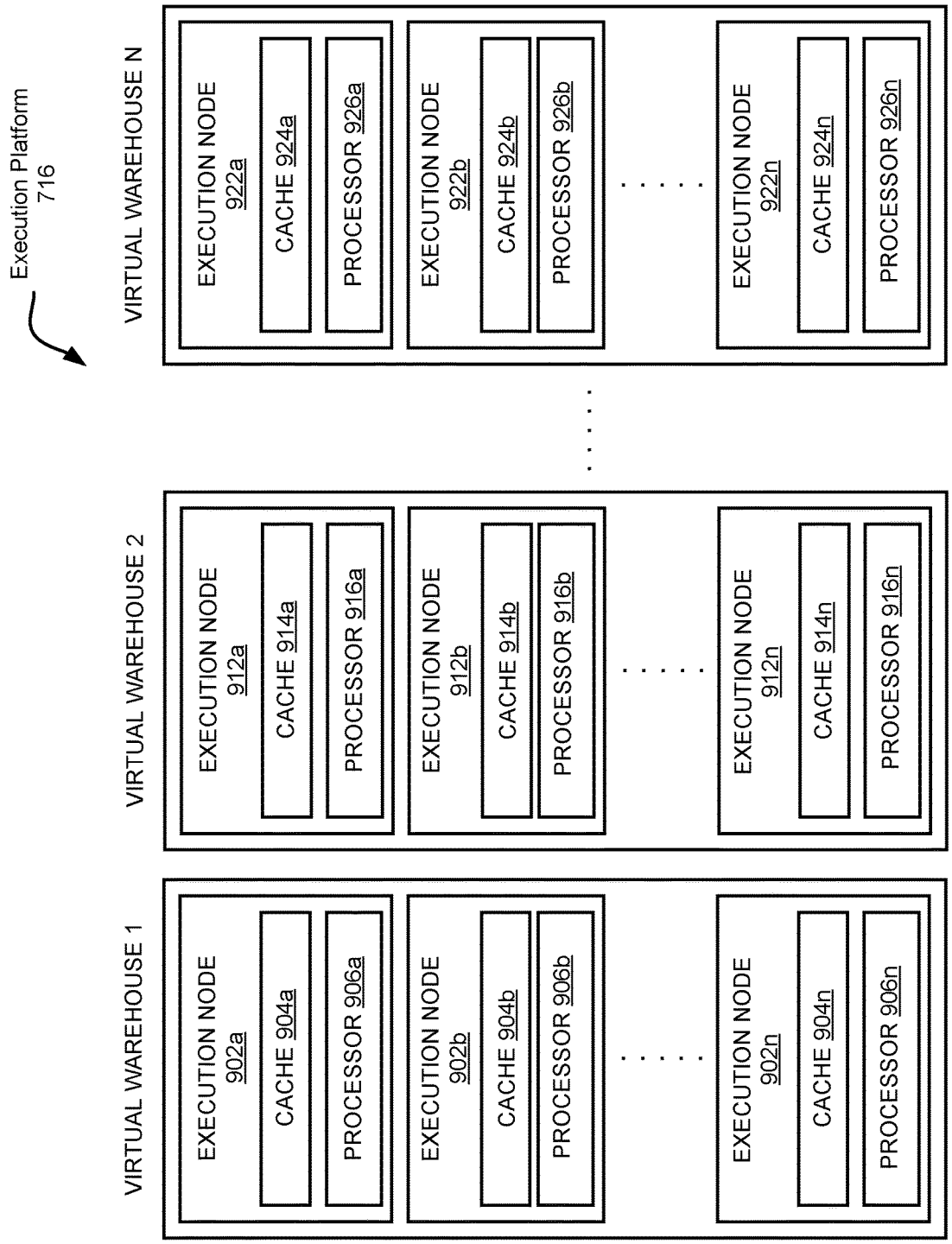
FIG. 9 is a block diagram illustrating components of an execution platform, according to embodiments of the disclosure.

FIG. 9 is a block diagram depicting an embodiment of an execution platform 716. As shown in FIG. 9, execution platform 716 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, execution platform 716 can add new virtual warehouses and drop existing virtual warehouses in real-time based on the current processing needs of the systems and users. This flexibility allows the execution platform 716 to quickly deploy large amounts of computing resources when needed without being forced to continue paying for those computing resources when they are no longer needed. All virtual warehouses can access data from any data storage device (e.g., any storage device in storage platform 710).

Although each virtual warehouse shown in FIG. 9 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 712a-712n shown in FIG. 7. Thus, the virtual warehouses are not necessarily assigned to a specific data storage device 712a-712n and, instead, can access data from any of the data storage devices 712a-712n within the storage platform 710. Similarly, each of the execution nodes shown in FIG. 9 can access data from any of the data storage devices 712a-712n. In some embodiments, a particular virtual warehouse or a particular execution node may be temporarily assigned to a specific data storage device, but the virtual warehouse or execution node may later access data from any other data storage device.

In the example of FIG. 9, virtual warehouse 1 includes three execution nodes 902a, 902b, and 902n. Execution node 902a includes a cache 904a and a processor 906a. Execution node 902b includes a cache 904b and a processor 906b. Execution node 902n includes a cache 904n and a processor 906n. Each execution node 902a, 902b, and 902n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 1912a, 1912b, and 1912n. Execution node 1912a includes a cache 914a and a processor 916a. Execution node 1912n includes a cache 914n and a processor 916n. Execution node 1912n includes a cache 914n and a processor 916n. Additionally, virtual warehouse 3 includes three execution nodes 922a, 922b, and 922n. Execution node 922a includes a cache 924a and a processor 926a. Execution node 922b includes a cache 924b and a processor 926b. Execution node 922n includes a cache 924n and a processor 926n.

In some embodiments, the execution nodes shown in FIG. 9 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 9 each include one data cache and one processor, alternate embodiments may include execution nodes containing any number of processors and any number of caches. Additionally, the caches may vary in size among the different execution nodes. The caches shown in FIG. 9 store, in the local execution node, data that was retrieved from one or more data storage devices in storage platform 710. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 710.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 716, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 9 as having multiple execution nodes. The multiple execution nodes associated with each virtual warehouse may be implemented using multiple computing systems at multiple geographic locations. For example, an instance of virtual warehouse 1 implements execution nodes 902a and 902b on one computing platform at a geographic location and implements execution node 902n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 716 is also fault tolerant. For example, if one virtual warehouse fails, that virtual warehouse is quickly replaced with a different virtual warehouse at a different geographic location.

A particular execution platform 716 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 710, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In an embodiment, distinct execution platforms 716 are allocated to different accounts in the multiple tenant database. This can ensure that data stored in cache in the distinct execution platforms 716 is made accessible only to the associated account. The size of each distinct execution platform 716 can be tailored to the processing needs of each account in the multiple tenant database. In an embodiment, a provider account has its own execution platform 716 and a receiver account has its own execution platform 716. In an embodiment, a receiver account receives a share object from the provider account that enables the receiver account to generate a materialized view over data owned by the provider account. The execution platform 716 of the receiver account may generate the materialized view. When an update is made to the source table for the materialized view (i.e. the data owned by the provider account), the execution platform 716 of the provider account will execute the update. If the receiver account generated the materialized view, then the execution platform 716 of the receiver account may be responsible for refreshing the materialized view with respect to its source table.

Figure 10:
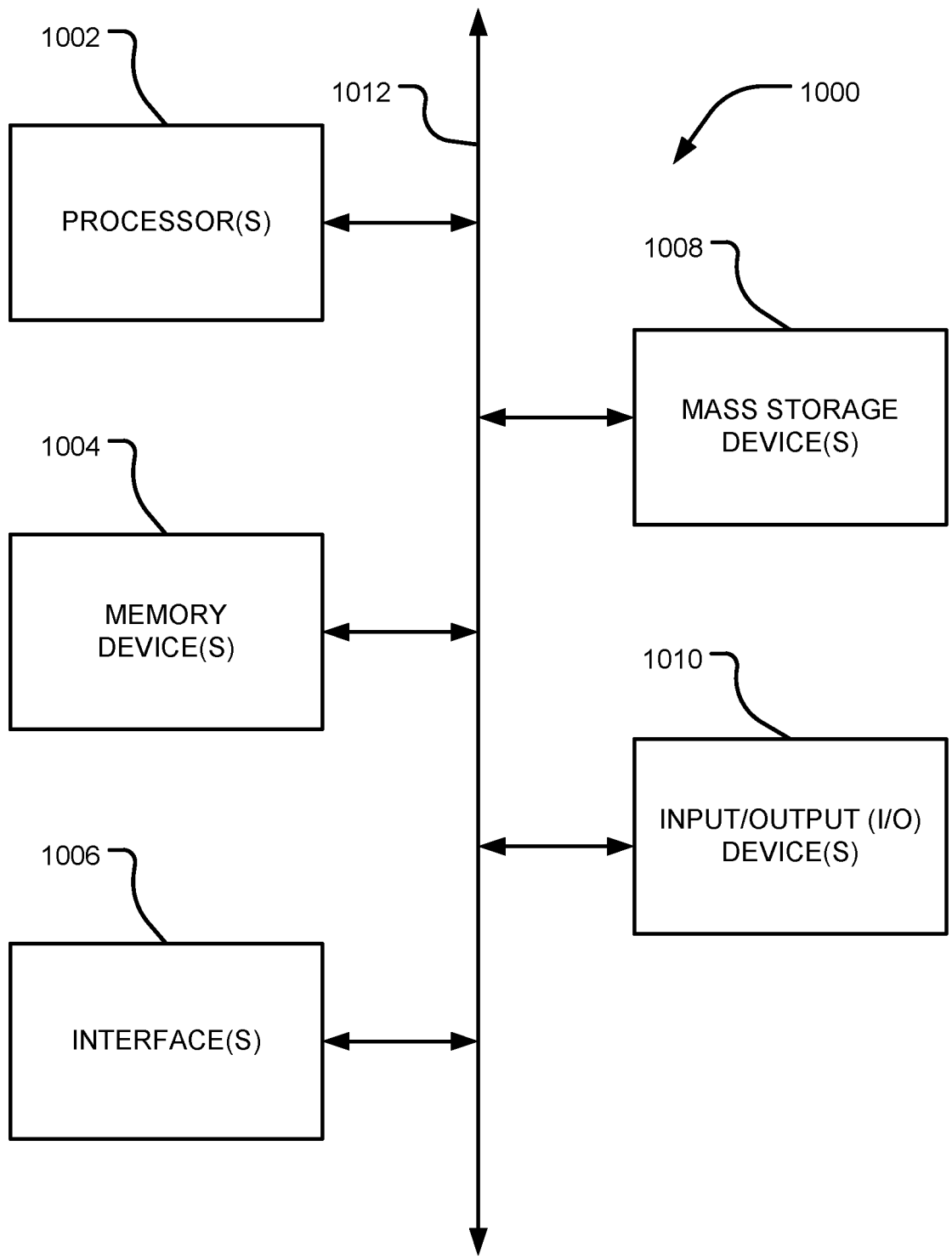
FIG. 10 is a schematic diagram of an example computing device, according to embodiments of the disclosure.

FIG. 10 is a block diagram depicting an example computing device 1000. In some embodiments, computing device 1000 is used to implement one or more of the systems and components discussed herein. Further, computing device 1000 may interact with any of the systems and components described herein. Accordingly, computing device 1000 may be used to perform various procedures and tasks, such as those discussed herein. Computing device 1000 can function as a server, a client or any other computing entity. Computing device 1000 can be any of a wide variety of computing devices, such as a desktop computer, a notebook computer, a server computer, a handheld computer, a tablet, and the like.

Computing device 1000 includes one or more processor(s) 1002, one or more memory device(s) 1004, one or more interface(s) 1006, one or more mass storage device(s) 1008, and one or more Input/Output (I/O) device(s) 1010, all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM)) and/or nonvolatile memory (e.g., read-only memory (ROM)). Memory device(s) 1004 may also include rewritable ROM, such as Flash memory.

Mass storage device(s) 1008 include various computer readable media, such as magnetic tapes, magnetic disks, optical disks, solid state memory (e.g., Flash memory), and so forth. Various drives may also be included in mass storage device(s) 1008 to enable reading from and/or writing to the various computer readable media. Mass storage device(s) 1008 include removable media and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, lenses, CCDs or other image capture devices, and the like.

Interface(s) 1006 include various interfaces that allow computing device 1000 to interact with other systems, devices, or computing environments. Example interface(s) 1006 include any number of different network interfaces, such as interfaces to local area networks (LANs), wide area networks (WANs), wireless networks, and the Internet.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1000 and are executed by processor(s) 1002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein. The terms "module" or "component" are intended to convey independent in how the modules, components, or their functionality or hardware may be implemented in different embodiments.

EXAMPLES

The following examples pertain to further embodiments.

Example 1 is a method for incrementally updating a materialized view. The method includes generating a materialized view based on a source table. The method includes merging the source table and the materialized view to detect an update to the source table that is not reflected in the materialized view. The update to the source table comprises one or more of a new row inserted to the source table since a prior refresh of the source table or a deleted row removed from the source table since a prior compaction of the source table. The method includes, in response to detecting the update to the source table, applying the update to the materialized view.

Example 2 is a method as in Example 1, wherein applying the update to the materialized view comprises: in response to the new row inserted to the source table, refreshing the materialized view by inserting the new row into the materialized view; and in response to the deleted row removed from the source table, compacting the materialized view by deleting from the materialized view a row corresponding to the deleted row.

Example 3 is a method as in any of Examples 1-2, wherein the update comprises the new row inserted to the source table and the deleted row removed from the source table, and wherein inserting the new row into the materialized view is prioritized over deleting from the materialized view a row corresponding to the deleted row.

Example 4 is a method as in any of Examples 1-3, wherein deleting the row from the materialized view occurs only after detecting a plurality of deleted rows removed from the source table equal to or exceeding a predetermined threshold number of deleted rows.

Example 5 is a method as in any of Examples 1-4, wherein: refreshing the materialized view by inserting the new row into the materialized view comprises executing a DML command on the materialized view; and compacting materialized view by deleting from the materialized view a row corresponding to the deleted row comprises executing a DML command on the materialized view.

Example 6 is a method as in any of Examples 1-5, wherein the source table comprises one or more micro-partitions, and wherein: the new row inserted to the source table comprises a new micro-partition inserted to the source table; and the deleted row removed from the source table comprises a deleted micro-partition removed from the source table.

Example 7 is a method as in any of Examples 1-6, wherein applying the update to the materialized view comprises: in response to detecting the new micro-partition inserted to the source table, refreshing the materialized view by inserting the new micro-partition into the materialized view; and in response to detecting the deleted micro-partition removed from the source table, compacting the materialized view by deleting from the materialized view a micro-partition rowset corresponding to the deleted micro-partition.

Example 8 is a method as in any of Examples 1-7, wherein merging the source table and the materialized view comprises generating a merged table, and wherein the method further comprises scanning the merged table to detect one or more impacted micro-partitions comprising one or more of: a new micro-partition inserted to the source table that is not present in the materialized view; or an absence of a deleted micro-partition removed from the source table that is still present in the materialized view.

Example 9 is a method as in any of Examples 1-8, wherein the materialized view cannot be accessed by a client account before the update is applied to the materialized view.

Example 10 is a method as in any of Examples 1-9, wherein: the source table comprises a linear transformation comprising a plurality of micro-partitions; the materialized view comprises corresponding micro-partitions that correspond with the plurality of micro-partitions of the source table; and the micro-partitions of the source table constitute immutable storage objects in a database storage system.

Example 11 is a method as in any of Examples 1-10, further comprising generating a source table log comprising: a log of one or more new rows inserted to the source table since the prior refresh of the source table; and a log of one or more deleted rows removed from the source table since the prior compaction of the source table.

Example 12 is a method as in any of Examples 1-11, further comprising maintaining two versions of the materialized view, wherein the two versions comprise: a last refresh version of the materialized view, wherein the new row is inserted into the materialized view; and a last compact version of the materialized view, wherein the row corresponding to the deleted row is removed from the materialized view.

Example 13 is a method as in any of Examples 1-12, wherein the source table and the materialized view comprise metadata, and wherein the metadata for the source table and the materialized view is consistent.

Example 14 is a method as in any of Examples 1-13, further comprising generating cost statistics comprising: maintenance statistics comprising one or more of: a number of micro-partitions on the source table that have been materialized; a total number of micro-partitions on the source table; or a total number of partitions of the materialized view; and usage statistics comprising one or more of: a number of times a query is accessed on the materialized view; or a number of times a query is accessed on the source table.

Example 15 is non-transitory computer readable storage media storing instructions that, when executed by one or more processors, cause the one or more processors to: generate a materialized view for a source table; merge the source table and the materialized view to detect an update to the source table that is not reflected in the materialized view, wherein the update to the source table comprises one or more of: a new row inserted to the source table since a prior refresh of the source table; or a deleted row removed from the source table since a prior compaction of the source table; and in response to detecting the update to the source table, apply the update to the materialized view.

Example 16 is non-transitory computer readable storage media as in Example 15, wherein the instructions cause the one or more processors to apply the update to the materialized view by: in response to the new row inserted to the source table, refreshing the materialized view by inserting the new row into the materialized view; and in response to the deleted row removed from the source table, compacting the materialized view by deleting from the materialized view a row corresponding to the deleted row.

Example 17 is non-transitory computer readable storage media as in any of Example 15-16, wherein the update comprises the new row inserted to the source table and the deleted row removed from the source table, and wherein the instructions cause the one or more processors to prioritize inserting the new row into the materialized view over deleting from the materialized view a row corresponding to the deleted row.

Example 18 is non-transitory computer readable storage media as in any of Example 15-17, wherein: refreshing the materialized view by inserting the new row into the materialized view comprises executing a DML command on the materialized view; and compacting materialized view by deleting from the materialized view a row corresponding to the deleted row comprises executing a DML, command on the materialized view.

Example 19 is non-transitory computer readable storage media as in any of Example 15-18, wherein the instructions cause the one or more processors to merge the source table and the materialized view to generate a merged table, and wherein the instructions further cause the one or more processors to scan the merged table to detect one or more impacted rows comprising one or more of: the new row inserted to the source table that is not present in the materialized view; or an absence of the deleted row removed from the source table that is still present in the materialized view.

Example 20 is non-transitory computer readable storage media as in any of Example 15-19, wherein: the source table comprises a linear transformation comprising a plurality of micro partitions; the materialized view comprises corresponding micro partitions that correspond to the plurality of micro partitions of the source table; and the micro partitions of the source table constitute immutable storage objects in a database storage system.

Example 21 is a system of incrementally updating a materialized view. The system includes means for generating a materialized view for a source table. The system includes means for merging the source table and the materialized view to detect an update to the source table that is not reflected in the materialized view. The update to the source table comprises one or more of a new row inserted to the source table since a prior refresh of the source table or a deleted row removed from the source table since a prior compaction of the source table. The system includes means for applying the update to the materialized view in response to detecting the update to the source table.

Example 22 is a system as in Example 21, wherein the means for applying the update to the materialized view is configured to: in response to the new row inserted to the source table, refresh the materialized view by inserting the new row into the materialized view; and in response to the deleted row removed from the source table, compact the materialized view by deleting from the materialized view a row corresponding to the deleted row.

Example 23 is a system as in any of Examples 21-22, wherein the update comprises the new row inserted to the source table and the deleted row removed from the source table, and wherein the means for applying the update is configured to prioritize inserting the new row into the materialized view over deleting from the materialized view the row corresponding to the deleted row.

Example 24 is a system as in any of Examples 21-23, wherein the means for merging the source table and the materialized view is configured to generate a merged table, and wherein the system further comprises means for scanning the merged table to detect one or more impacted rows comprising one or more of: the new row inserted to the source table that is not present in the materialized view; or an absence of the deleted row removed from the source table that is still present in the materialized view.

Example 25 is a system as in any of Examples 21-24, wherein: the source table comprises a linear transformation comprising a plurality of micro partitions; the materialized view comprises corresponding micro partitions that correspond with the plurality of micro partitions of the source table; and the micro partitions of the source table constitute immutable storage objects in a database storage system.

Example 26 is a system or device that includes means for implementing a method, system, or device as in any of Examples 1-25.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural, functional, object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A method comprising:
    storing a source table including a set of micro-partitions in a plurality of shared storage devices;
    generating, by a compute service manager independent of the plurality of shared storage devices, a materialized view based on the source table, the materialized view being a persistent query result and the materialized view combining information in the set of micro-partitions in the source table into a single micro-partition in the materialized view;
    merging, by the compute service manager, the source table and the materialized view to generate a merged table;
    scanning the merged table to identify an update to the source table not reflected in the materialized view, the update including a modification to one or more of micro-partitions in the set of micro-partitions in the source table;
    applying, by one or more execution nodes assigned by the compute service manager, the update to the materialized view including updating the single micro-partition in the materialized view corresponding to the set of micro-partitions in the source table to generate an updated materialized view; and
    executing, by the compute service manager, a query using data from the updated materialized view without accessing the source table.

2. The method of claim 1, further comprising:
    redirecting a query away from the materialized view to the source table while the update is being applied to the materialized view.

3. The method of claim 1, wherein applying the update to the materialized view comprises:
    in response to determining a new row has been inserted into the source table, refreshing the materialized view by inserting the new row into the materialized view; and
    in response to determining a row has been deleted from the source table, compacting the materialized view by deleting the row from the materialized view.

4. The method of claim 3, wherein refreshing the materialized view by inserting the new row into the materialized view is prioritized over compacting the materialized view by deleting the row from the materialized view.

5. The method of claim 3, wherein compacting the materialized view occurs in response to detecting a quantity of deleted row exceeds a predetermined threshold number of deleted rows.

6. The method of claim 1, wherein the update comprises one or more of a new micro-partition being added to the source table or one or more of micro-partitions being deleted from the source table.

7. A system comprising:
    at least one hardware processor; and
    at least one memory storing instructions that cause the at least one hardware processor to perform operations comprising:
    storing a source table including a set of micro-partitions in a plurality of shared storage devices;
    generating, by a compute service manager independent of the plurality of shared storage devices, a materialized view based on the source table, the materialized view being a persistent query result and the materialized view combining information in the set of micro-partitions in the source table into a single micro-partition in the materialized view;
    merging, by the compute service manager, the source table and the materialized view to generate a merged table;
    scanning the merged table to identify an update to the source table not reflected in the materialized view, the update including a modification to one or more of micro-partitions in the set of micro-partitions in the source table;
    applying, by one or more execution nodes assigned by the compute service manager, the update to the materialized view including updating the single micro-partition in the materialized view corresponding to the set of micro-partitions in the source table to generate an updated materialized view; and
    executing, by the compute service manager, a query using data from the updated materialized view without accessing the source table.

8. The system of claim 7, the operations further comprising:
    redirecting a query away from the materialized view to the source table while the update is being applied to the materialized view.

9. The system of claim 7, wherein applying the update to the materialized view comprises:
   in response to determining a new row has been inserted into the source table, refreshing the materialized view by inserting the new row into the materialized view; and
   in response to determining a row has been deleted from the source table, compacting the materialized view by deleting the row from the materialized view.

10. The system of claim 9, wherein refreshing the materialized view by inserting the new row into the materialized view is prioritized over compacting the materialized view by deleting the row from the materialized view.

11. The system of claim 9, wherein compacting the materialized view occurs in response to detecting a quantity of deleted row exceeds a predetermined threshold number of deleted rows.

12. The system of claim 7, wherein the update comprises one or more of a new micro-partition being added to the source table or one or more of micro-partitions being deleted from the source table.

13. A non-transitory machine-storage medium embodying instructions that, when executed by a machine, cause the machine to perform operations comprising:
   storing a source table including a set of micro-partitions in a plurality of shared storage devices;
   generating, by a compute service manager independent of the plurality of shared storage devices, a materialized view based on the source table, the materialized view being a persistent query result and the materialized view combining information in the set of micro-partitions in the source table into a single micro-partition in the materialized view;
   merging, by the compute service manager, the source table and the materialized view to generate a merged table;
   scanning the merged table to identify an update to the source table not reflected in the materialized view, the update including a modification to one or more of micro-partitions in the set of micro-partitions in the source table;
   applying, by one or more execution nodes assigned by the compute service manager, the update to the materialized view including updating the single micro-partition in the materialized view corresponding to the set of micro-partitions in the source table to generate an updated materialized view; and
   executing, by the compute service manager, a query using data from the updated materialized view without accessing the source table.

14. The non-transitory machine-storage medium of claim 13, further comprising:
   redirecting a query away from the materialized view to the source table while the update is being applied to the materialized view.

* * * * *